US008892097B2

(12) United States Patent
Manna et al.

(10) Patent No.: US 8,892,097 B2
(45) Date of Patent: Nov. 18, 2014

(54) METHOD FOR OPTIMIZED HIGH PRIORITY PLMN SEARCH AND NORMAL SERVICE SCAN IN LIMITED SERVICE

(71) Applicant: Samsung Electronics Co., Ltd., Gyeonggi-do (KR)

(72) Inventors: Avijit Manna, Kolkata (IN); Kirti Keshav, Bangalore (IN); Prakash Rao, Bangalore (IN); Ravikumar Kalaimani, Bangalore (IN)

(73) Assignee: Samsung Electronics Co., Ltd (KR)

( * ) Notice: Subject to any disclaimer, the term of this patent is extended or adjusted under 35 U.S.C. 154(b) by 20 days.

(21) Appl. No.: 13/764,077

(22) Filed: Feb. 11, 2013

(65) Prior Publication Data

US 2013/0210428 A1  Aug. 15, 2013

(30) Foreign Application Priority Data

Feb. 10, 2012  (IN) .............................. 508/CHE/2012

(51) Int. Cl.
*H04W 4/00* (2009.01)
*H04W 48/16* (2009.01)
*H04W 64/00* (2009.01)
*H04W 52/02* (2009.01)

(52) U.S. Cl.
CPC .......... *H04W 52/0209* (2013.01); *H04W 48/16* (2013.01); *H04W 64/006* (2013.01); *H04W 52/0229* (2013.01); *H04W 52/0245* (2013.01); Y02B 60/50 (2013.01)
USPC ..................... 455/434; 455/435.1; 455/435.2; 455/435.3; 455/422.1

(58) Field of Classification Search
CPC .................... H04W 52/0209; H04W 52/0229; H04W 52/0245; H04W 48/16; H04W 64/006; Y02B 60/50
USPC .......................... 455/434, 435.2, 435.1, 435.3
See application file for complete search history.

(56) References Cited

U.S. PATENT DOCUMENTS

| 2004/0116110 | A1* | 6/2004 | Amerga et al. ............. 455/422.1 |
| 2008/0112346 | A1* | 5/2008 | Tolpin et al. .................. 370/311 |
| 2009/0156205 | A1 | 6/2009 | Rowitch |
| 2010/0279637 | A1* | 11/2010 | Umatt ......................... 455/161.2 |
| 2010/0317403 | A1* | 12/2010 | Mizuo ........................... 455/558 |
| 2013/0225169 | A1* | 8/2013 | Farnsworth et al. .......... 455/436 |

FOREIGN PATENT DOCUMENTS

GB  2 413 737  11/2005

* cited by examiner

*Primary Examiner* — Khai M Nguyen
(74) *Attorney, Agent, or Firm* — The Farrell Law Firm, P.C.

(57) ABSTRACT

Methods and apparatus are provided for selecting a serving cell in a communication network for reducing power consumption in a UE, is provided. Network topology information is determined by obtaining cell rank information for the UE, extracting a mobility state of the UE, and applying a double moving average principle to the cell rank information of the UE. The network topology information is employed to determine a change in network topology. Radio Frequency (RF) scans are optimized based on the network topology.

24 Claims, 11 Drawing Sheets

METHOD FOR OPTIMIZED HIGH PRIORITY PLMN SEARCH AND NORMAL SERVICE SCAN IN LIMITED SERVICE

PRIORITY

This application claims priority under 35 U.S.C. §119(a) to an application filed in the Indian Intellectual Property Office on Feb. 10, 2012, and assigned Application No. 508/CHE/2012, the contents of which are incorporated herein by reference.

BACKGROUND OF THE INVENTION

1. Field of the Invention

The present invention relates generally to the field of cellular communications, and more particularly to a method for optimizing power consumption at a mobile station by minimizing mobile terminal searching for a home network.

2. Description of the Related Art

Mobile and cellular phones have enabled mobile station users to roam over large geographic areas, while also providing the flexibility to carry different types of information over a single system. Mobile stations include portable units such as, for example, cellular phones, mobile phones and like, which can be used to transmit digitized sound, text, data, digital video or other information existing in digital form. Cellular communication systems typically provide service to a geographic area by dividing the geographical area into adjoining sections called Public Land Mobile Networks (PLMNs). The boundaries of the sections are often determined by, for example, size, geographical features, population density, or national borders. Every PLMN is further subdivided into cells, where each cell is serviced by a radio transceiver. Cells can be visualized as small geographical zones covering the region. These zones, or cells, are joined to completely blanket the PLMN. Each cell has an allocation of distinct frequencies for communication with the mobile station. The frequencies of adjoining cells are different to prevent radio interference between mobile station users in adjoining cells.

A mobile station is also free to roam. Specifically, the mobile station is allowed to operate as it travels through a variety of geographical regions. To ensure the existence of adequate communication, the mobile station will change cells and communicate with proximate cells as it moves. It is common for wireless communications network operators to offer service plans, for example, nationwide calling plans, with coverage in geographical areas that are served by third party network operators, and not a home operator's network. The home operator generally shares agreements with other network operators in order to provide service to subscribers in areas where the home operator does not actually own and operate network infrastructure.

When the user of a mobile station has a dedicated channel for communication with other phone users, decisions regarding which cell to communicate through are made at the network level. However, when the mobile station does not have a dedicated channel, the mobile station has more authority in deciding which cell it considers itself to be located. The mobile station constantly monitors the power level of radio signals transmitted by neighboring cells. Based on the monitored power levels, and information received from the cells, the mobile station makes a decision regarding which cell it is located. By choosing a particular cell, the mobile station simultaneously selects the PLMN to which the cell belongs. The selection of a particular cell can be based on a ranking of neighboring cells.

In addition to searching for neighboring cells, the mobile station also searches for its Home Public Land Mobile Network (HPLMN). The HPLMN is the network with which the mobile user has a subscription relationship, and the network with which the mobile user prefers to do business. In the automatic network selection mode, the mobile station automatically attempts to select and register with the HPLMN.

Generally, the mobile station makes attempts to return to its HPLMN when visiting another PLMN. A roaming mobile station periodically scans for its home network. The network scanning procedure consumes power, which significantly reduces battery life compared to the power consumed when the mobile station is not roaming and scanning for its home network. Reduction of battery life reduces the length of time that the mobile station can be operated before its battery is depleted.

It is also desirable for the mobile station user to communicate through their HPLMN in order to reduce call costs. When the mobile station uses other PLMNs charges may vary, and the user may be unaware of higher costs as the call is being made. It is possible for the mobile station to acquire another PLMN, other than the HPLMN, as it travels, and remain with this network long after the mobile station has moved back within range of the HPLMN. As a result, mobile stations may visit PLMNs other than the HPLMN more often than is necessary.

Networks may specify a list of equivalent PLMNs that recipient mobile stations may treat as though the equivalent PLMNs belong to the same network. Hence, a mobile station will not perform periodic HPLMN searches when camped on networks that are equivalent to the HPLMN of the mobile station. However, rendering the equivalent PLMN feature is substantially currently unavailable. Further, the equivalent PLMNs feature is dependent upon competing network operators configuring network information in a manner that reduces unnecessary HPLMN searching by roaming mobile stations. If there is no indication that the roaming PLMN is equivalent to the mobile station's HPLMN, the roaming mobile station will continue searching for its HPLMN.

The mobile station performs a search even when the network topology is not changing due to limited mobility, and when and there is no possibility of finding the HPLMN. Further, the mobile station can get stuck in a limited service state. Still, the mobile station does not change its scanning rate based on the perceived rate of change of network topology by the mobile station, which leads to high power consumption by the mobile station in limited service state.

Further, signal strength alone is not a reliable way to determine movement of the mobile device. For example, signal strength can change based on a vehicle passing near the mobile device. Thus, changing of a scan rate should not be based only on a fixed signal strength threshold.

The aforementioned techniques utilize a large amount of battery power of the mobile station while performing excessive searches for an HPLMN.

SUMMARY OF THE INVENTION

The present invention has been made to address at least the above problems and/or disadvantages and to provide at least the advantages described below. Accordingly, an aspect of the present invention reduces battery power consumption at the mobile station by reducing the scans performed by the mobile station.

Another aspect of the present invention reduces a number of high priority HPLMN scans.

An additional aspect of the present invention reduces the number of scans performed when the mobile station is in a limited network availability state.

According to an aspect of the present invention, a method for selecting a serving cell in a communication network for reducing power consumption in a User Equipment (UE), is provided. Network topology information is determined by obtaining cell rank information for the UE, extracting a mobility state of the UE, and applying a double moving average principle to the cell rank information of the UE. The network topology information is employed to determine a change in network topology. RF scans are optimized based on the network topology.

According to another aspect of the present invention, a UE is provided in a wireless communication network configured for reducing power consumption in the UE. The UE is configured for determining network topology information by: obtaining cell rank information for the UE; extracting a mobility state of the UE; and applying a double moving average principle to the cell rank information of the UE. The network topology information is employed to determine a change in network topology. RF scans are optimized based on the network topology.

According to a further aspect of the present invention, an apparatus is provided in a wireless communication network configured for reducing power consumption in a UE. The apparatus includes an integrated circuit comprising at least one processor. The apparatus also includes at least one memory comprising a computer program code in the integrated circuit. The at least one memory and the computer program code are configured to, with the at least one processor, cause the apparatus to determine network topology information by: obtaining cell rank information for the UE; extracting a mobility state of the UE; and applying a double moving average principle to the cell rank information of the UE. The network topology information employed to determine a change in network topology. RF scans are optimized based on the network topology.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
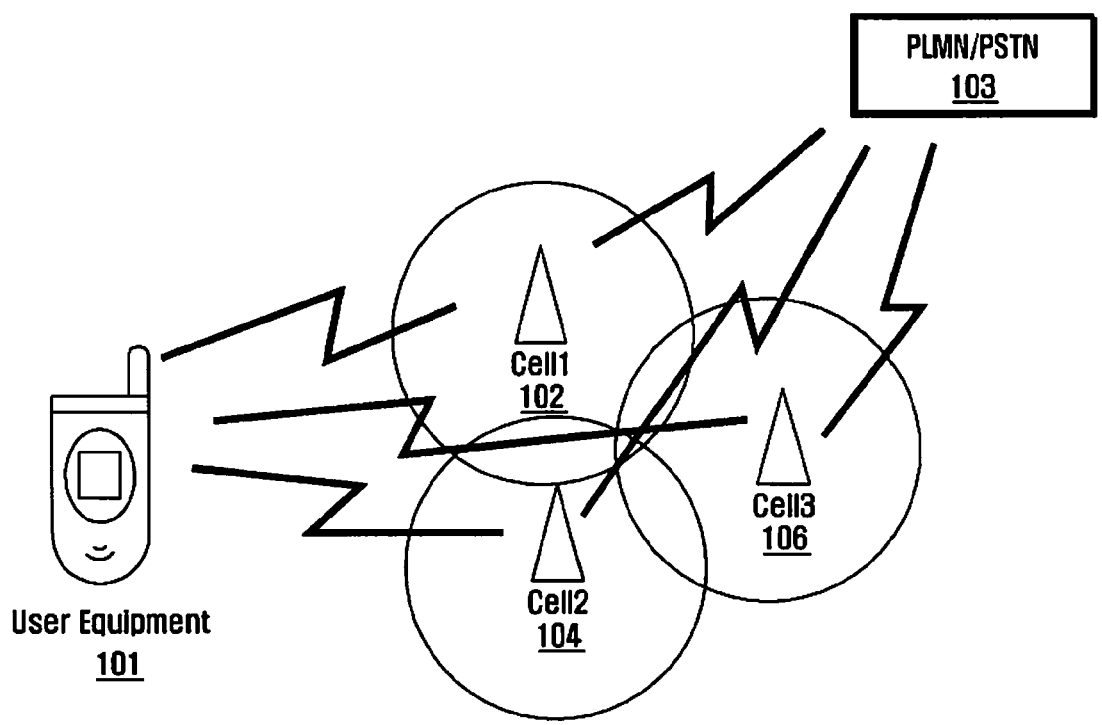
FIG. 1 is a diagram illustrating basic components of a conventional cellular network, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The embodiments of the present invention provide a method and system for reducing power consumption at a mobile station by minimizing the HPLMN scans and limited availability scans that are performed.

Throughout the specification, the terms apparatus, UE, mobile station and device have been used interchangeably. The apparatus is a digital data transmission unit such as, for example, a mobile phone, a Personal Digital Assistant (PDA), and the like.

FIG. 1 is a diagram illustrating basic components of a conventional cellular network, according to an embodiment of the present invention. The mobile communication system includes UE 101 and a network part. In an embodiment of the present invention, the UE 101 may also include a chip on the communication system that is capable of supporting implementation of embodiments of the present invention. The network part includes a fixed infrastructure of the radio system, i.e., the core network, the radio access network and the base station system.

The core network can have a Mobile services Switching Center (MSC), where the MSC can be at the center point of the circuit-switched side of the core network. Further, the MSC can provide switching, paging, UE 101 location registrations, handover management, collection of subscriber billing information, encryption parameter management, and echo cancellation to the network. The number of MSCs may vary in from network to network. Large core networks can have a separate Gateway Mobile services Switching Center (GMSC), which can be responsible for circuit-switched connections between the core network and external networks. The GMSC can be located between the MSC and external networks. An external network may be embodied as, for example, a PLMN or a Public Switched Telephone Network (PSTN) 103. The PLMN/PSTN 103 is a public provider of mobile communication services.

A base station can be part of the PLMN/PSTN 103. For example, the UE 101 can be directly subscribed to the PLMN/PSTN 103 associated with the base station. Thus, the PLMN/PSTN 103 associated with base station can be referred to as a home PLMN (HPLMN). Further, the UE 101 can be directly subscribed to a disparate PLMN/PSTN 103 other than the PLMN/PSTN 103 associated with base station. Hence, the PLMN/PSTN 103 associated with the base station can be referred to as a Visited PLMN (VPLMN).

The core network can include information about a home location of the UE's service provider. Furthermore, the core network can comprise information about roaming information on the UE 101 in the area of the MSC. Visitor location information can be the same as home location information. However, the visitor location information is stored temporarily. The visitor location information enables calls to be processed by the registered UE 101 registered. A visitor location register may also receive the necessary additional information from a home location register.

A user can make or receive calls through the UE 101 by communicating with a cell site, depending upon the geographic location of the UE 101 and the cell coverage area that is provided by each cell site. The UE 101 can communicate with any of cell 1 102, cell 2 104, cell 3 106, even though the UE 101 is not illustrated as being located within the corresponding cell coverage areas. [PLEASE RELABEL CELL 2 AS 104 AND CELL 3 AS 106, IN FIG. 1] Under normal operating conditions, the extent to which the UE 101 can communicate with the cell site depends on the geographic location of the UE 101 and the size of the cell coverage area of each cell site. The cellular network can include a plurality of cell sites. Further, at least one cell site can be connected to the PLMN/PSTN 103.

Figure 2:
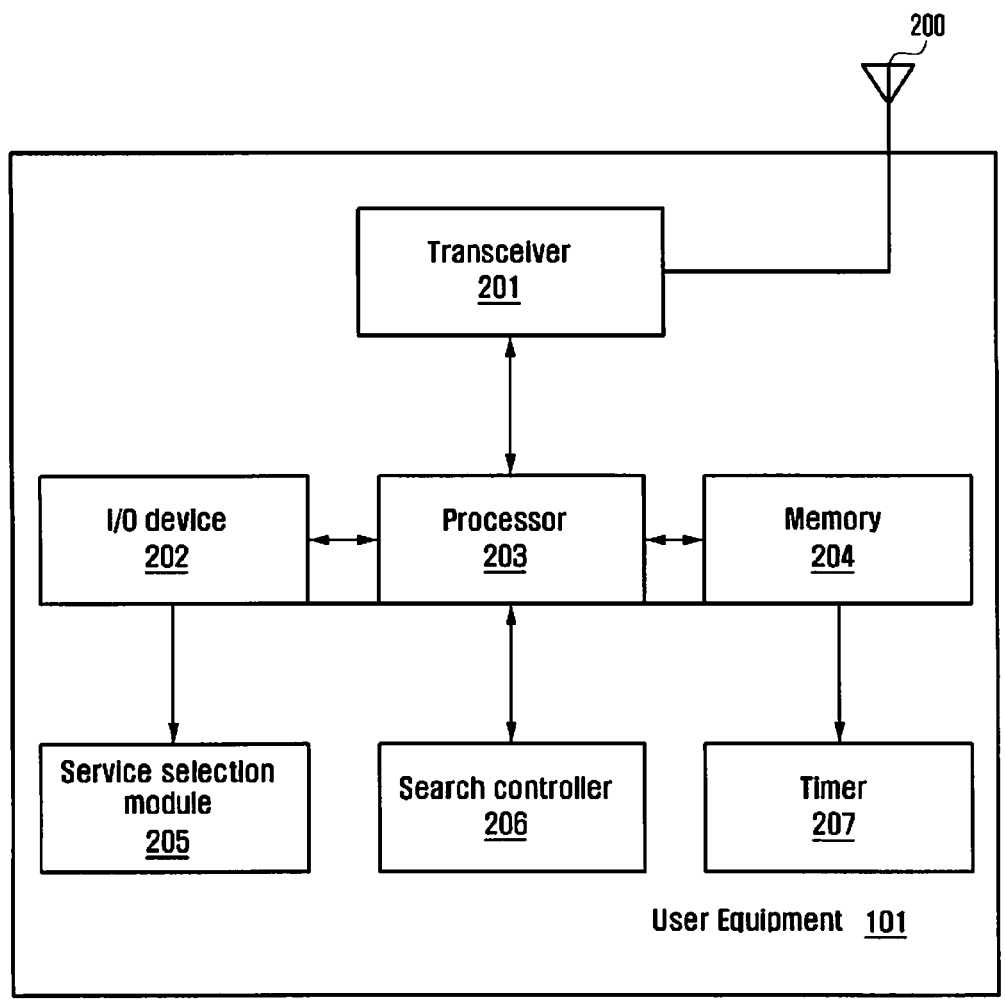
FIG. 2 is a block diagram illustrating a UE, according to an embodiment of the present invention.

The UE 101 includes a transceiver 201 and an antenna for communication by, for example, radio waves with cell sites. [PLEASE PROVIDE A REFERENCE NUMERAL FOR THE ANTENNA AND LABEL IN FIG. 2]

In an embodiment of the present invention, various air-interface technologies can be implemented to facilitate communication between the mobile station and the cell sites.

Further, in an embodiment of the present invention, HPLMN and limited service area scans are discussed, however the same method is applicable to all types of network scans, which a typical mobile phone performs in order to camp for an appropriate service. Examples of such scans include, for example, most preferred system reselection, no service area scans, and neighbor cell searches.

FIG. 2 is a block diagram illustrating the UE, according to an embodiment of the present invention. The UE 101 includes the antenna, the transceiver 201, a processor 203, a memory 204, a service selection module 205, a timer 207, a search controller 206 and input output devices 202, such as, for example, a speaker, a display, a keypad, a microphone, and the like. The transceiver 201 receives incoming signals from and transmits outgoing signals to an antenna. The transceiver 201 is connected to the processor 203. The processor 203 can perform as a control system, which can carry out the intelligent roaming features and logic of embodiments of the present invention. The processor 203 can execute any suitable combination or use of software, hardware and/or firmware for service selection and search control. The service selection module 205 can control the various components of the UE 101 to permit a user to make and receive calls. Further, the processor 203 can access the memory 204, via an address/data bus. The processor 203 may be embodied as any commercially available or custom microprocessor suitable for an embedded application. The memory 204 is representative of an overall hierarchy of memory devices containing the software and data used to implement the functionality of a multi-mode mobile terminal. The memory 204 can include, but is not limited to, a cache, a Read Only Memory (ROM), a Programmable ROM (PROM), an Erasable PROM (EPROM), an Electrically EPROM (EEPROM), a flash memory, a Static Random Access Memory (SRAM), and a Dynamic Random Access Memory (DRAM). Furthermore, the timer 207 can keep record of time intervals for the UE 101.

The service selection module 205 can enable classification of service providers such as, for example, home, visited, and the like. Further, the service selection module 205 can rank the neighboring cells. The service provider selection model can also include an adjustable threshold that can be used to divide preference levels between those levels that represent suitable or desirable service providers from which service can be requested.

Further, the search controller 206 can control the UE 101 to perform a search for the network while roaming. The search controller 206 can utilize the timer 207 to manage the frequency at which network searches are performed.

The search controller 206 can receive a stream of digitized base-band signal samples from the analog front-end or transceiver 201. Searcher hardware can contain one or more searcher, each of which can search one or more cells simultaneously. The search controller 206 initiates a cell search by controlling the searcher hardware, and maintains a list of monitored cells and corresponding search parameters, as well as multipath delay profiles. The search controller 206 uses the measurements provided by the searcher hardware in making decisions in maintaining the cell sets. Further, the search controller 206 can utilize the timer 207 to efficiently utilize the searcher hardware for searching multiple cells. The timer 207 determines when to perform a search and generate a search list for the search controller 206. The search can be scheduled by utilizing information such as, for example, a search rate requirement, a search timing requirement, a predetermined search priority, and the like. In an embodiment of the present invention, cells classified as high priority cells or home cells can be searched more often than cells classified as visiting cells.

Most of the time, the UE 101 is connected to its HPLMN. However, the UE 101 can move out of its HPLMN and into a VPLMN. When the UE 101 roams into the VPLMN, the UE 101 can be camped to the VLPMN.

In an embodiment of the present invention, the UE 101 may also include an integrated circuit chip that is provided with a processor and a memory unit. The memory unit may include a computer program code. The processor together with the memory unit may be configured to obtain, for example, network topology information and ranking information, and to apply double moving average principles to such information. Further, this information may be used to determine the change in network topology. As a result, the RF scans may be optimized and power consumption may be reduced.

Figure 3:
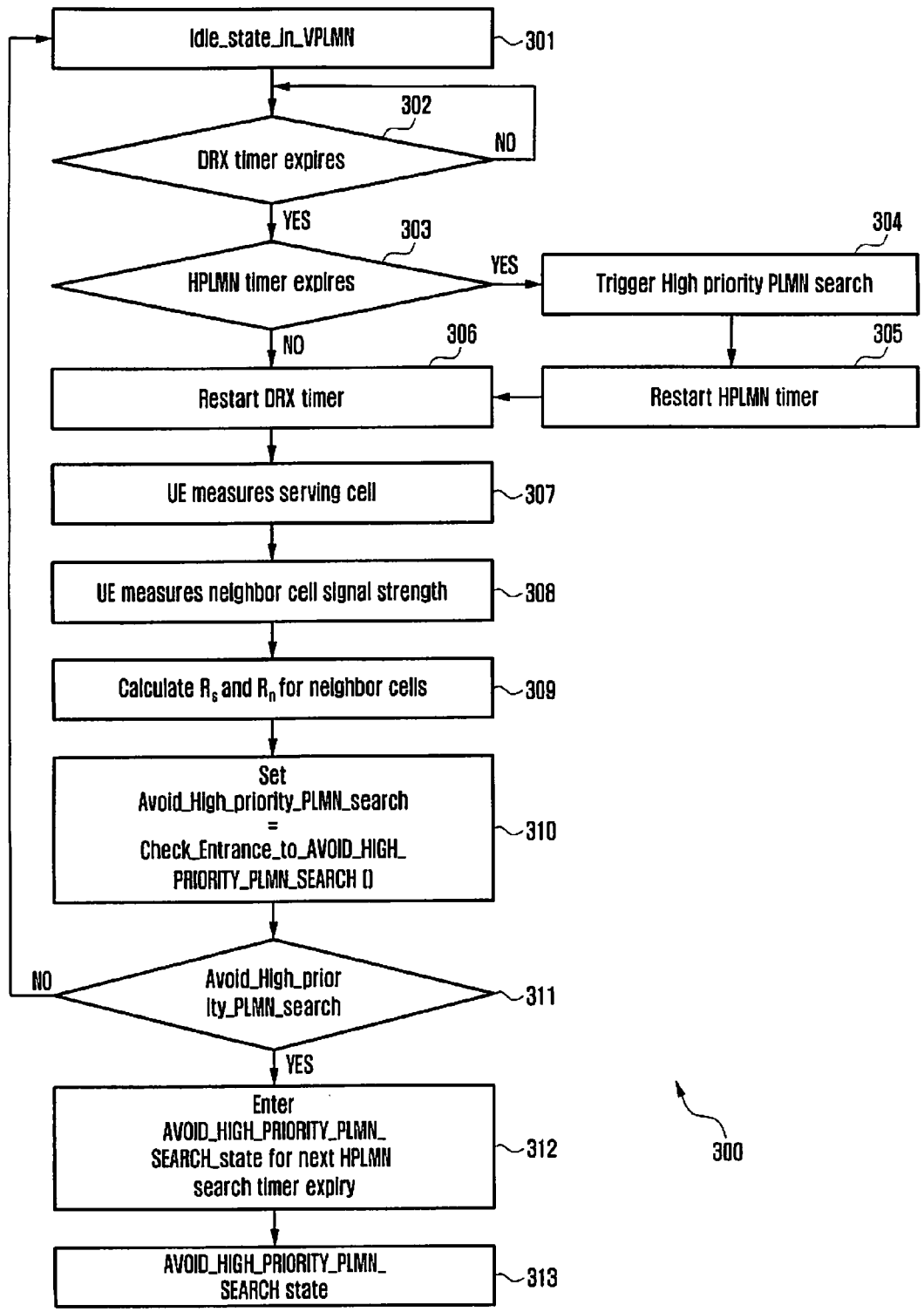
FIG. 3 is a flow chart illustrating a process for an avoid_high_priority_PLMN_search state, according to an embodiment of the present invention.

FIG. 3 is a flow chart illustrating the process of an avoid_high_priority_PLMN_search state, according to an embodiment of the present invention. When the UE 101 is camped at VPLMN, the UE 101 is in an idle state, in step 301. In step 302, it is determined whether a Discontinuous Reception (DRX) cycle expires. After expiry of the DRX cycle, the UE 101 runs a HPLMN search timer, and determines whether the HPLMN search timer expires, in step 303. The HPLMN search timer can be provided by the network. Once the HPLMN search timer expires, the UE 101 triggers a high priority PLMN search, in step 304. Further, the HPLMN timer is restarted, in step 305. The DRX timer is restarted, in step 306.

If the HPLMN search timer does not expires, the DRX timer is restarted, in step 306. The UE 101 continuously measures the serving cells, in step 307, and neighbor cells signal strength or rank, in step 308. The UE 101 calculates an R-criterion, which generates rankings Rs and Rn for the serving cell and neighbor cells, respectively, in step 309. The rankings may be generated by measuring the signal strengths of the serving and neighboring cells. Further, appropriate offsets and hysteresis are applied to these measurements. The cells may then be ranked relative to each other in decreasing order of their measured signal strengths, and the normal idle mode procedures in VPLMN are continued. The UE 101 is considered to be in IDLE_state_in_VPLMN.

In every DRX cycle when the UE 101 is in IDLE_state_in-VPLMN, the UE 101 can request a Check_Entrance_to_AVOID_HIGH_PRIORITY_PLMN_SEARCH( )function to check if the UE 101 can stop searching for a high priority PLMN the next time the HPLMN search timer expires. Once the Check_Entrance_to_AVOID_HIGH_PRI-ORITY_PLMN_SEARCH( )function is executed, the function generates an output value that can be passed back to the UE 101. The UE 101 assigns the output value of the function to Avoid_High_Priority_PLMN_Search, in step 310. In step 311, it is determined whether the output value of the function is true, and the UE 101 can stop searching for a high priority PLMN the next time the HPLMN search timer expires. If the output value of the function is true, the UE 101 can enter an Avoid_High_Priority_PLMN_Search_state for the next expiration of the HPLMN search timer, in step 312, i.e. the UE 101 can stop searching for a high priority PLMN the next time the HPLMN search timer expires. Further, the UE 101 enters an Avoid_High_Priority_PLMN_Search_state, in step 313. However, if the output value of the function is false, the UE 101 returns to its idle state in VPLMN, in step 301. The various steps in method 300 can be performed in the order presented, in a different order, or simultaneously. Further, in some embodiments of the present invention, some steps listed in FIG. 3 can be omitted.

The Avoid_High_Priority_PLMN_Search function utilizes the same conditions as those described above, such as, for example, checking whether ranks are the same for a few DRX cycles, a difference between a long term and short term average is within a limit, and an accelerometer sensor in the UE 101 shows low movement.

Figure 4:
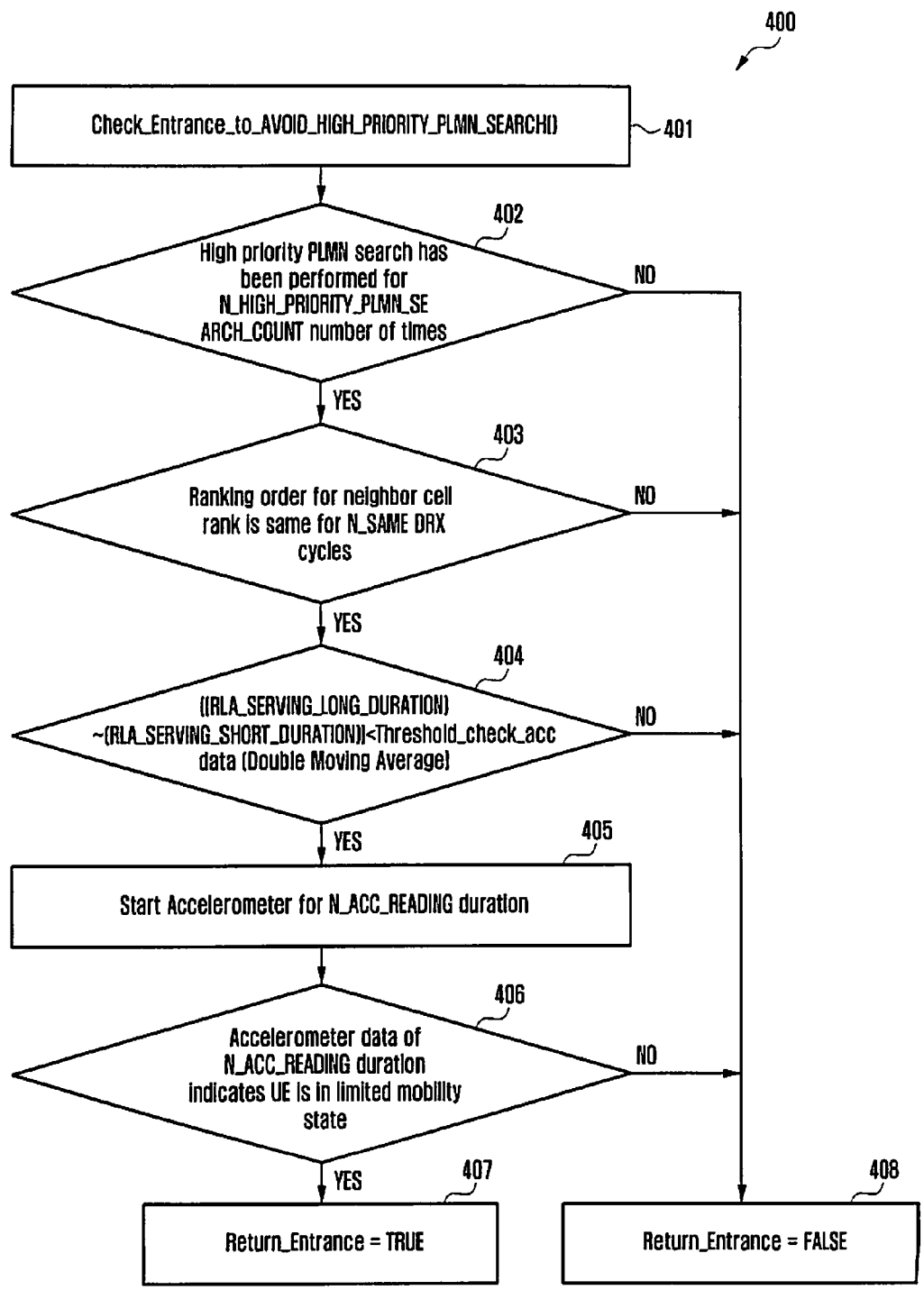
FIG. 4 is a flow chart illustrating a process for a check_entrance_Avoid_High_Priority_PLMN_Search function, according to an embodiment of the present invention.

FIG. 4 is a flow chart illustrating a process of a check_entrance_Avoid_High_Priority_PLMN_Search function, according to an embodiment of the present invention. The Check_Entrance_to_AVOID_HIGH_PRI-ORITY_PLMN_SEARCH( ) function is requested, and the function is initialized, in step 401. The function determines whether a high priority PLMN search has been performed a number of times equal to a N_HIGH_PRIORITY_PLMN_SEARCH_COUNT, in step 402. If the high priority PLMN search has not been performed a number of times equal to the N_HIGH_PRIORITY_PLMN_SEARCH_COUNT, the function returns FALSE as the output value, in step 408. However, if the high priority PLMN 103 search has been performed a number of times equal to the N_HIGH_P-RIORITY_PLMN_SEARCH_COUNT, the function determines whether the ranking order for neighbor cell rank is the same for N_SAME DRX cycles, in step 403. If the ranking order for neighbor cell rank is not same for N_SAME DRX cycles, the function returns FALSE as the output value, in step 408. However, if the ranking order for neighbor cell rank is same for N_SAME DRX cycles, the function determines whether the difference between a long term and short term average is within a limit. i.e. ((RLA_SERVING_LONG_DU-RATION)−(RLA_SERVING_SHORT_DURATION))< Threshold_check_acc_data (Double Moving Average), in step 404. If the difference between the long term and short term average is not within the limit, the function returns FALSE as the output value, in step 408. However, if the difference between the long term and short term average is within the limit, the accelerometer for N_ACC_READING duration is started, in step 405. Further, it is determined whether the accelerometer data of a N_ACC_READING duration indicates the UE 101 is in a limited mobility state, in step 406. If the accelerometer data of the N_ACC_READ-ING duration does not indicate that the UE 101 is in the limited mobility state, the function return FALSE as the output value, in step 408. However, if the accelerometer data of the N_ACC_READING duration indicates that the UE 101 is in the limited mobility state, the function returns TRUE as the output value, in step 407. The various steps in method 400 can be performed in the order presented, in a different order or simultaneously. Further, in some embodiments of the present invention, some steps listed in FIG. 4 can be omitted.

Figure 5:
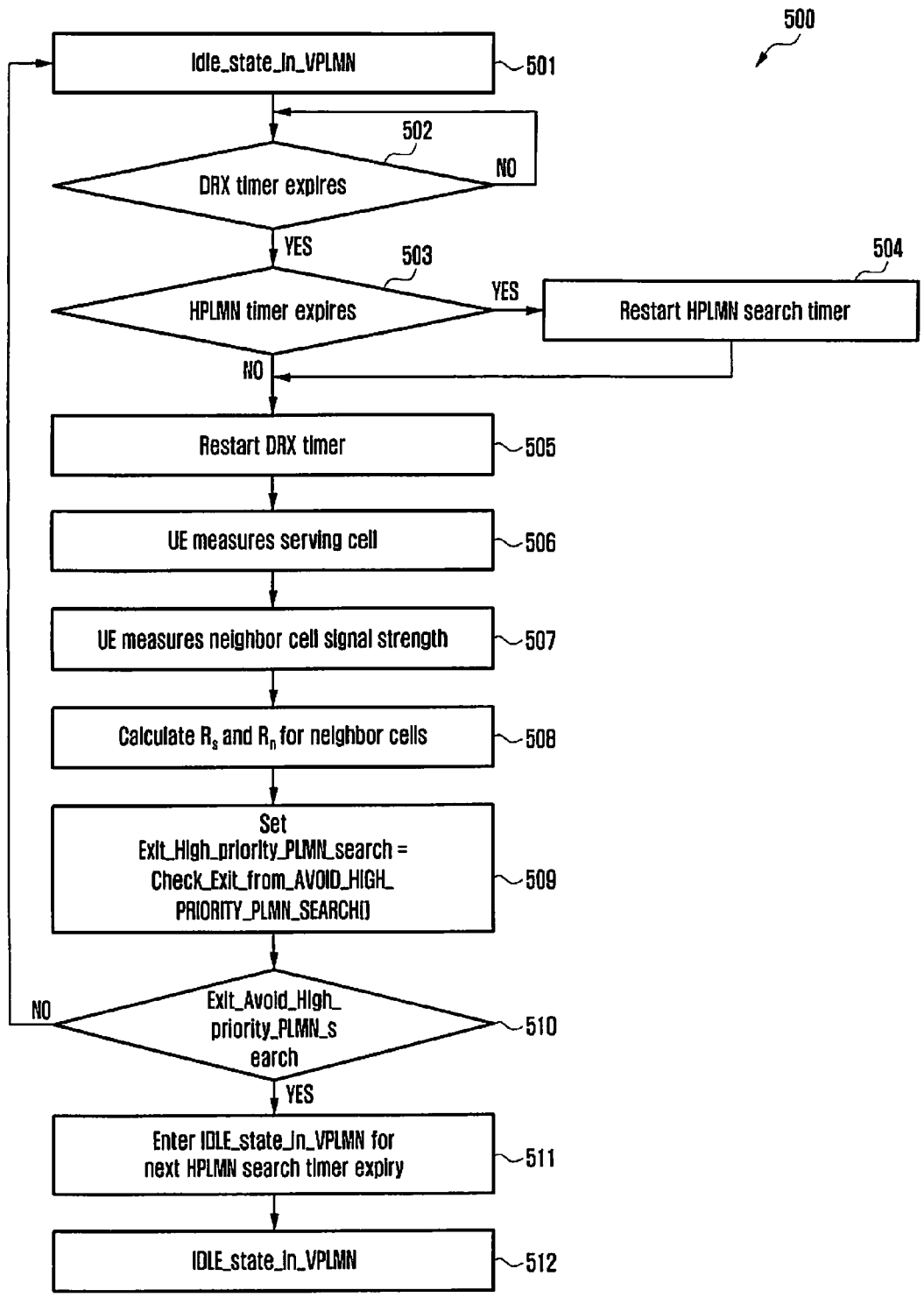
FIG. 5 is a flow chart illustrating a process for an exit_from_avoid_high_priority_PLMN_search state, according to an embodiment of the present invention.

In an embodiment of the present invention, the UE 101 can determine that it can stop searching for a high priority PLMN while using the function Check_Entrance_to_AVOI-D_HIGH_PRIORITY_PLMN_SEARCH ( ). The UE 101 can move to an AVOID_HIGH_PRIORITY_PLMN_SEARCH state. In the AVOID_HIGH_PRIORITY_PLMN_SEARCH state, the UE 101 would not perform the HPLMN search, even when HPLMN search timer has expired. FIG. 5 is a flow chart illustrating a process of a exit_from_avoid_high_priority_PLMN_search state, according to an embodiment of the present invention. The UE 101 is camped on a VPLMN and in an idle state, in step 501. In the idle state, it is determined whether a DRX timer expires, in step 502. After expiry of the DRX timer, the UE 101 runs an HPLMN search timer, and determines whether the HPLMN timer expires, in step 503. The HPLMN search timer can be provided by the network. Once the HPLMN search timer expires, the UE 101 does not perform an HPLMN search and can restart HPLMN search timer, in step 504. The UE 101 may not perform the HPLMN search if the network topology does not change. After, restarting the HPLMN timer, the DRX timer is restarted, in step 505. [AN ARROW IS MISSING BETWEEN STEPS 504 AND 505 IN FIG. 5]

However, if the HPLMN search timer does not expire, the DRX timer is restarted, in step 505. As long as the UE 101 is in an AVOID_HIGH_PRIORITY_PLMN_SEARCH state, the UE 101 will not perform a high priority PLMN 103 search upon expiration of the HPLMN search timer. At every DRX timer expiry, the UE 101 measures the serving cells, in step 506 and neighbor cells signal strength or rank, in step 507. Further, the UE 101 calculates R-criterion. The R-criterion generates rankings Rs and Rn for the serving cell and neighbor cells, respectively, in step 508. The normal idle mode procedures in a VPLMN can be continued, and the UE 101 is considered to be in an IDLE_state_in_VPLMN.

In every DRX cycle, when the UE 101 is in the IDLE_state_in-VPLMN, the UE 101 requests a Check_Ex-it_from AVOID_HIGH_PRIORITY_PLMN_SEARCH( ) function to check certain necessary conditions that are to be met to continue in this state. The UE 101 can analyze change in network topology by analyzing, for example, a change in rank, a large difference in short term and long term average, or a motion as detected by the accelerometer. Once the Check_Exit_from_AVOID_HIGH_PRIORITY_PLMN_ SEARCH( ) function is executed, the function generates an output value that can be passed back to the UE 101. The UE 101 assigns the output value of the function to an Exit_High_Priority_PLMN_Search, in step 509. In step 510, the UE 101 determines whether the necessary conditions are met while using the function Check_Exit_from_AVOI-D_HIGH_PRIORITY_PLMN_SEARCH( ), in step 510. If the output of the function is true, the UE 101 exits the AVOID_HIGH_PRIORITY_PLMN_SEARCH state and moves to the IDLE_state_in_VPLMN for the next expiration of the HPLMN search timer. The IDLE_state_in_VPLMN is activated, in step 512. Further, the UE 101 can resume neighbor cell measurement and high priority PLMN search. The exit conditions can include usage of neighbor cell rank information, a double moving average, and an accelerometer sensor, which gives an estimate of a changing network topology from a perspective of the UE 101. However, if the output value of the function is false, the UE 101 returns to its idle state in VPLMN, at step 501. The various steps in method 500 can be performed in the order presented, in a different order, or simultaneously. Further, in some embodiments of the present invention, some steps listed in FIG. 5 can be omitted.

The Avoid_High_Priority_PLMN_Search function utilizes the same conditions as those described above, such as, for example, checking whether ranks are the same for a few DRX cycles, a difference between a long term and short term average is within a limit, and an accelerometer sensor in the UE 101 shows low movement.

Figure 6:
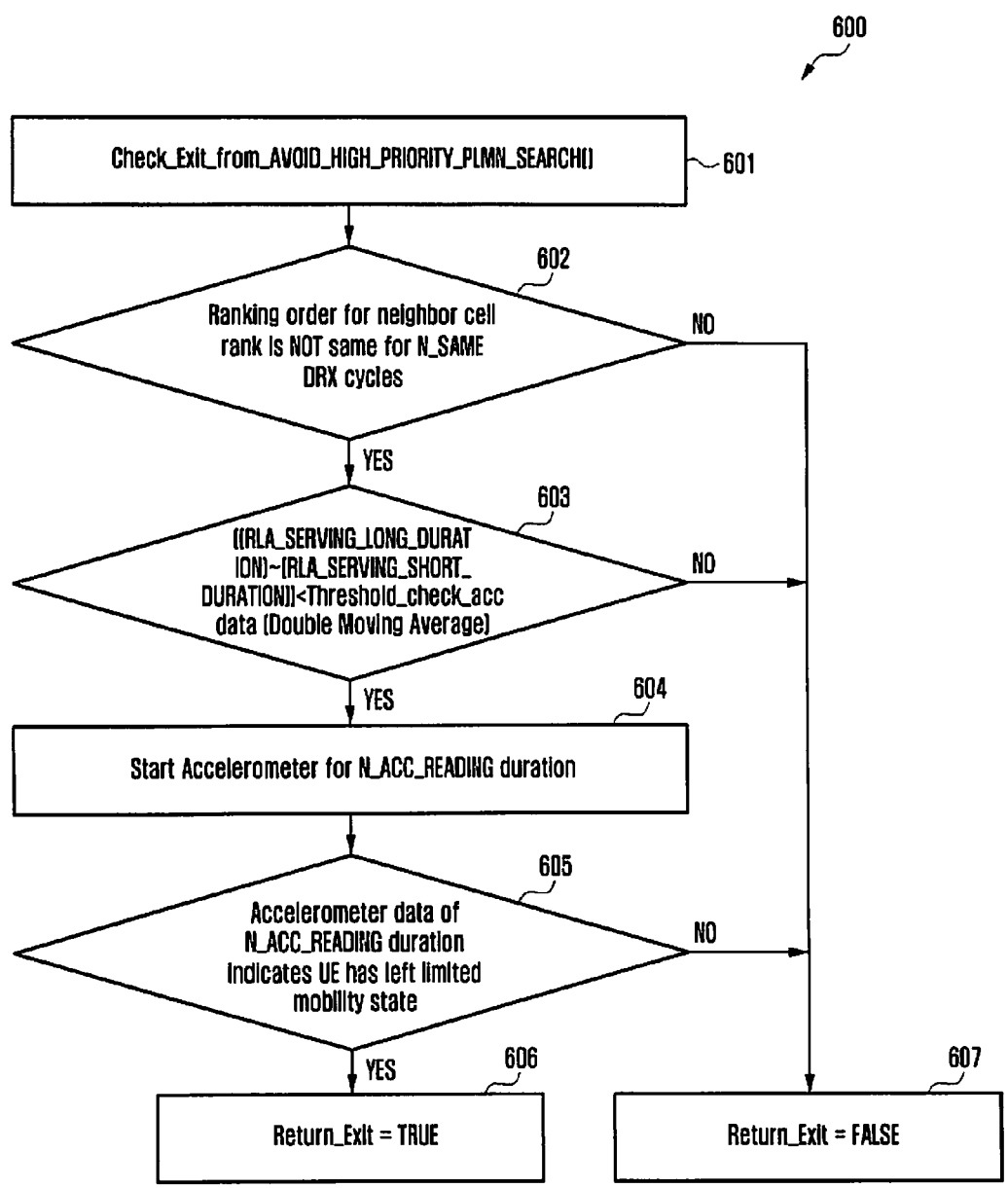
FIG. 6 is a flow chart illustrating a process for an check_exit_from_Avoid_High_Priority_PLMN_Search function, according to an embodiment of the present invention.

FIG. 6 is a flow chart illustrating a process of a check_exit_from_Avoid_High_Priority_PLMN_Search function, according to an embodiment of the present invention. The Check_Exit_from_AVOID_HIGH_PRIORITY_PLMN_SEARCH ( ) function is requested and initialized, in step 601. The function determines whether the ranking order for neighbor cell ranks is same for N_SAME DRX cycles, in step 602. If the ranking order for neighbor cell ranks is not same for N_SAME DRX cycles, the function return FALSE as the output value, in step 607. However, if the ranking order for neighbor cell ranks is same for N_SAME DRX cycles, the function determines whether the difference between a long term and short term average is within limit, i.e., ((RLA_SERVING_LONG_DURATION)−(RLA_SERVING_SHORT_DURATION))<Threshold_check_acc_data (Double Moving Average), in step 603. If the difference between the long term and short term average is not within limit, the function returns FALSE as the output value, in step 607. However, if the difference between the long term and short term average is within limit, the accelerometer for N_ACC_READING duration can be started, in step 604. The function determines whether the accelerometer data of N_ACC_READING duration indicates that the UE 101 has left a limited mobility state, in step 605. If the accelerometer data of N_ACC_READING duration does not indicate that the UE 101 has left the limited mobility state, the function returns FALSE as the output value, in step 607. However, if the accelerometer data of N_ACC_READING duration indicates that the UE 101 has left the limited mobility state, the function returns TRUE as the output value, in step 606. The various steps in method 600 can be performed in the order presented, in a different order or simultaneously. Further, in some embodiments of the present invention, some steps listed in FIG. 6 can be omitted.

Figure 7:
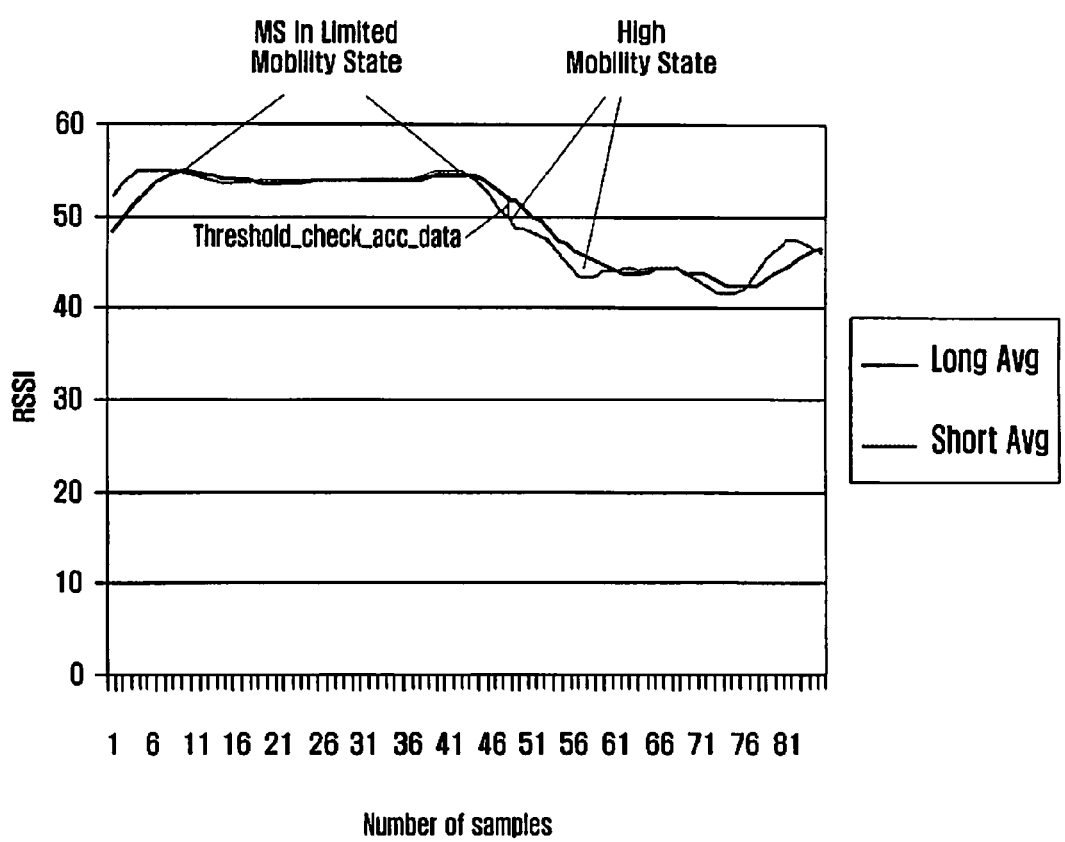
FIG. 7 is a graph illustrating a double moving average principle, according to an embodiment of the present invention.

FIG. 7 is a graph illustrating a double moving average principle, according to an embodiment of the present invention. The graph illustrates that the UE 101 in a limited mobility state has a long average, whereas the UE 101 in a high mobility state has a short average. The double moving average graph can be used to detect a rate of change of network topology from the perspective of the UE 101. Whenever there is large difference in the long term average and the short term average, it indicates that the network topology has changed. As a result, the change in user location may be identified.

In an embodiment of the present invention, absolute values for the various thresholds defined above can be defined by analyzing a plurality of output from various experiments performed in live air conditions.

In another embodiment of the present invention, when the UE 101 is camped at limited service, the UE 101 can perform a normal service search after every expiry of the normal service search timer. In an embodiment of the present invention, the normal service search timer value can be calculated internally by the UE 101. Further, the timer value can be in seconds or a few minutes. In the idle mode, the UE 101 can continuously measure the serving cell and neighbor cells in every DRX cycle.

Figure 8:
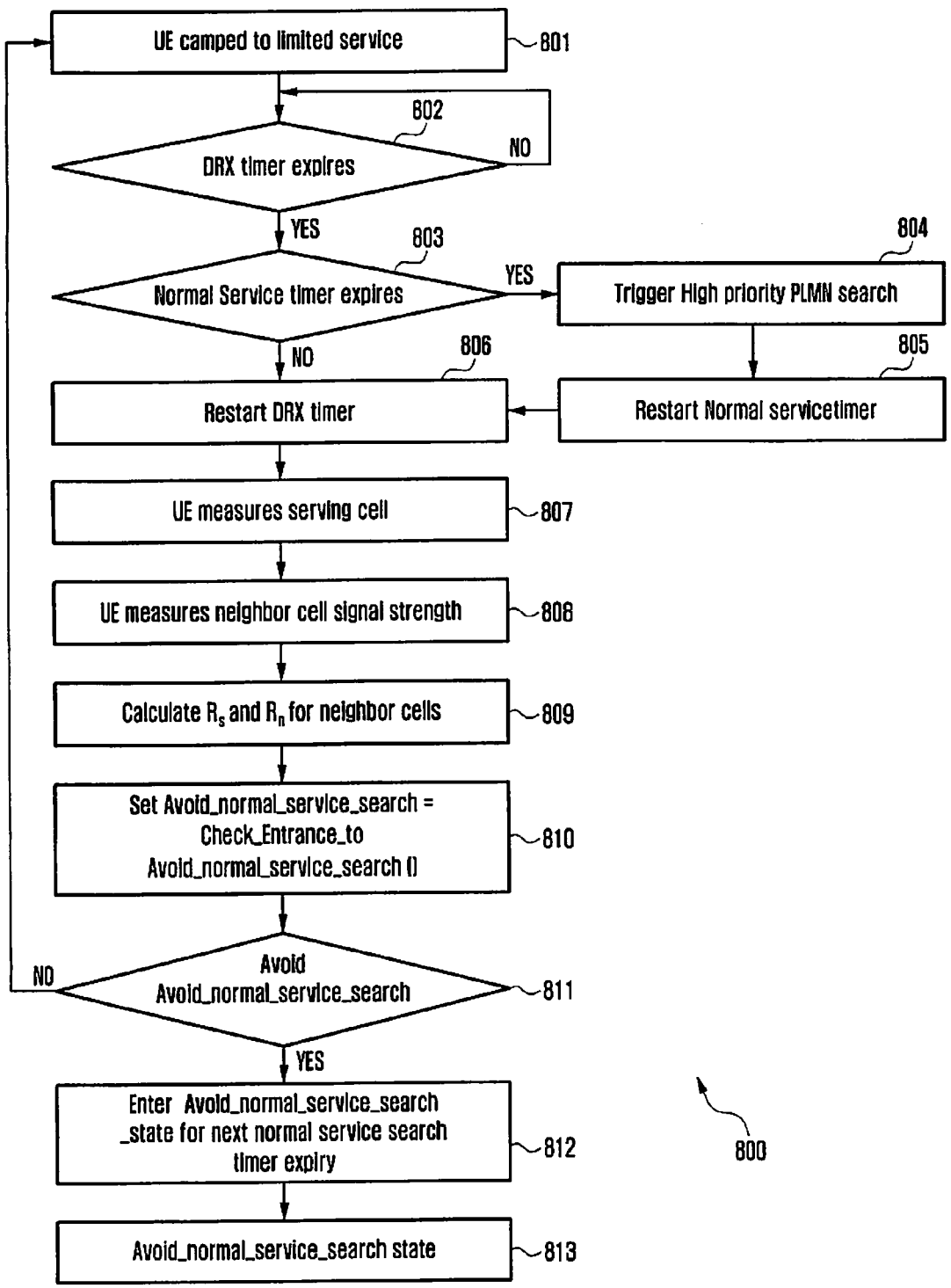
FIG. 8 is a flow chart illustrating a process for an entering_avoid_normal_service_search state, when a mobile station is camped to a limited service, according to an embodiment of the present invention.

FIG. 8 is a flow chart illustrating a process of a entering_avoid_normal_service_search state, when a UE is camped to limited service, according to an embodiment of the present invention. The UE 101 is camped to limited service, in step 801. In step 802, it is determined whether the DRX timer expires. The UE 101 runs a normal service search timer, and determines whether the normal service search timer expires, in step 803. Once the normal service search timer expires, the UE 101 triggers a high priority PLMN search, in step 804. Further, the normal service search timer is restarted, in step 805. After, restarting the normal service search timer, the DRX timer is restarted, in step 806.

However, if the normal service search timer does not expire, the DRX timer is restarted, in step 806. While the UE 101 is camped to limited service, the UE 101 can continuously measure the serving cells, in step 807, and neighbor cells signal strength or rank, in step 808. Further, the UE 101 calculates R-criterion. The R-criterion generates rankings Rs and Rn for the serving cell and neighbor cells, respectively, in step 809. The normal idle mode procedures in VPLMN are continued.

In every DRX cycle, when the UE 101 is camped to limited services, the UE 101 requests a Check_Entrance_to_AVOID_NORMAL_SERVICE_SEARCH ( ) function to determine whether the UE 101 can stop searching for a high priority PLMN the next time the normal service search timer expires. Once the Check_Entrance_to_AVOID_NORMAL_SERVICE_SEARCH ( ) function is executed, the function generates an output value, which can be passed back to the UE 101. The UE 101 assigns the output value of the function to an AVOID_NORMAL_SERVICE_SEARCH. The value of the AVOID_NORMAL_SERVICE_SEARCH is determined, in step 811. If the output value of the function is true, the UE 101 enters an AVOID_NORMAL_SERVICE_SEARCH_state for the next expiration of the normal service search timer, in step 812, i.e., the UE 101 can stop searching for a high priority PLMN the next time the normal service search timer expires. Further, the UE 101 activates an AVOID_NORMAL_SERVICE_SEARCH_state, in step 813. However, if the output value of the function is false, the UE 101 returns to its limited service state, at step 801. The various steps in method 800 can be performed in the order presented, in a different order or simultaneously. Further, in some embodiments of the present invention, some steps listed in FIG. 8 can be omitted.

The AVOID_NORMAL_SERVICE_SEARCH function utilizes the same conditions as those described above, such as, for example, checking whether ranks are the same for a few DRX cycle, a difference between a long term and short term average is within limit, and an accelerometer sensor in the UE 101 shows low movement, to detect whether the UE 101 can stop a normal service scan.

Figure 9:
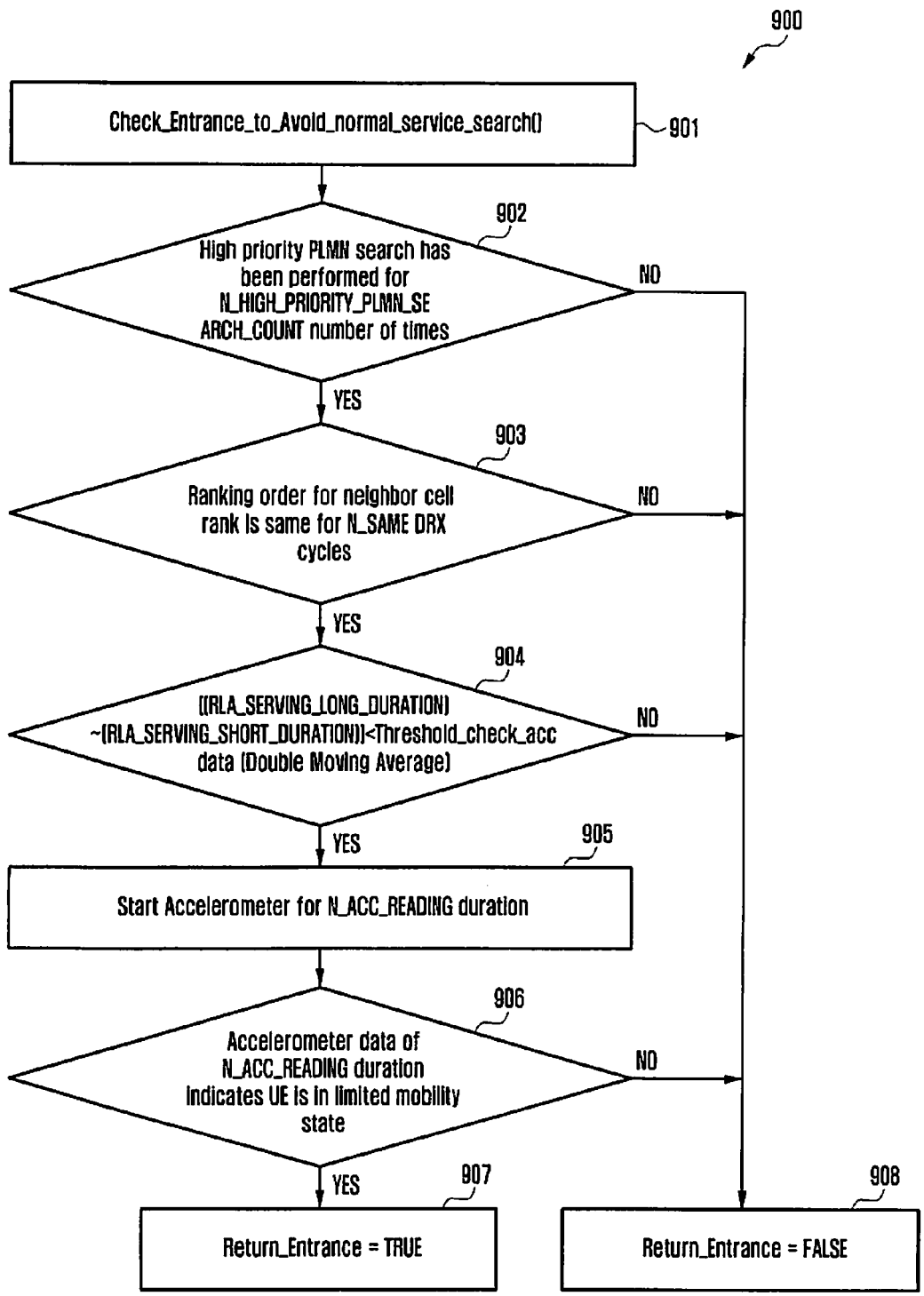
FIG. 9 is a flow chart illustrating a process for a check_entering_AVOID_NORMAL_SERVICE_SEARCH function, when a mobile station is camped to limited service, according to an embodiment of the present invention.

FIG. 9 is a flow chart illustrating a process of a check_entering_AVOID_NORMAL_SERVICE_SEARCH function, when the UE 101 is camped to limited service, according to an embodiment of the present invention. The Check_Entrance_to_AVOID_NORMAL_SERVICE_SEARCH ( ) function is requested and initialized, in step 901. The function determines whether a high priority PLMN search has been performed a number of times equal to a N_HIGH_PRIORITY_PLMN_SEARCH_COUNT, in step 902. If the high priority PLMN search has not been performed a number of times equal to the N_HIGH_PRIORITY_PLMN_SEARCH_COUNT, the function return FALSE as the output value, in step 908. However, if the high priority PLMN 103 search has been performed a number of times equal to the $N\_{HIGH}\_PRIORITY\_PLMN\_SEARCH\_COUNT$, the function determines whether the ranking order for neighbor cell ranks is same for N_SAME DRX cycles, in step 903. If the ranking order for neighbor cell ranks is not same for N_SAME DRX cycles, the function returns FALSE as the output value, in step 908. However, if the ranking order for neighbor cell ranks is same for N_SAME DRX cycles, the function determines whether the difference between a long term and short term average is within a limit, in step 904, i.e., ((RLA_SERVING_LONG_DURATION)−(RLA_SERVING_SHORT_DURATION))<Threshold_check_acc_data (Double Moving Average). If the difference between the long term and short term average is not within the limit, the function return FALSE as the output value, in step 908. If the difference between the long term and short term average is within limit, the accelerometer for N_ACC_READING duration is started, in step 905. Further, the function determines whether the accelerometer data of N_ACC_READING duration indicates that the UE 101 is in a limited mobility state, in step 906. If the accelerometer data of N_ACC_READING duration indicates that the UE 101 is not in the limited mobility state, the function returns (908) FALSE as the output value.

However, if the accelerometer data of N_ACC_READING duration indicates that the UE 101 is in the limited mobility state, the function returns TRUE as the output value, in step 907. The various steps in method 900 can be performed in the order presented, in a different order or simultaneously. Further, in some embodiments of the present invention, some steps listed in FIG. 9 can be omitted.

In an embodiment of the present invention, the UE 101 can determine that it can stop searching for a high priority PLMN while using function Check_Entrance_to_AVOID_NORMAL_SERVICE_SEARCH( ). The UE 101 can move to AVOID_NORMAL_SERVICE_SEARCH state. In AVOID_NORMAL_SERVICE_SEARCH state, the UE 101 would not perform a normal service search even if the normal service search timer has expired.

Figure 10:
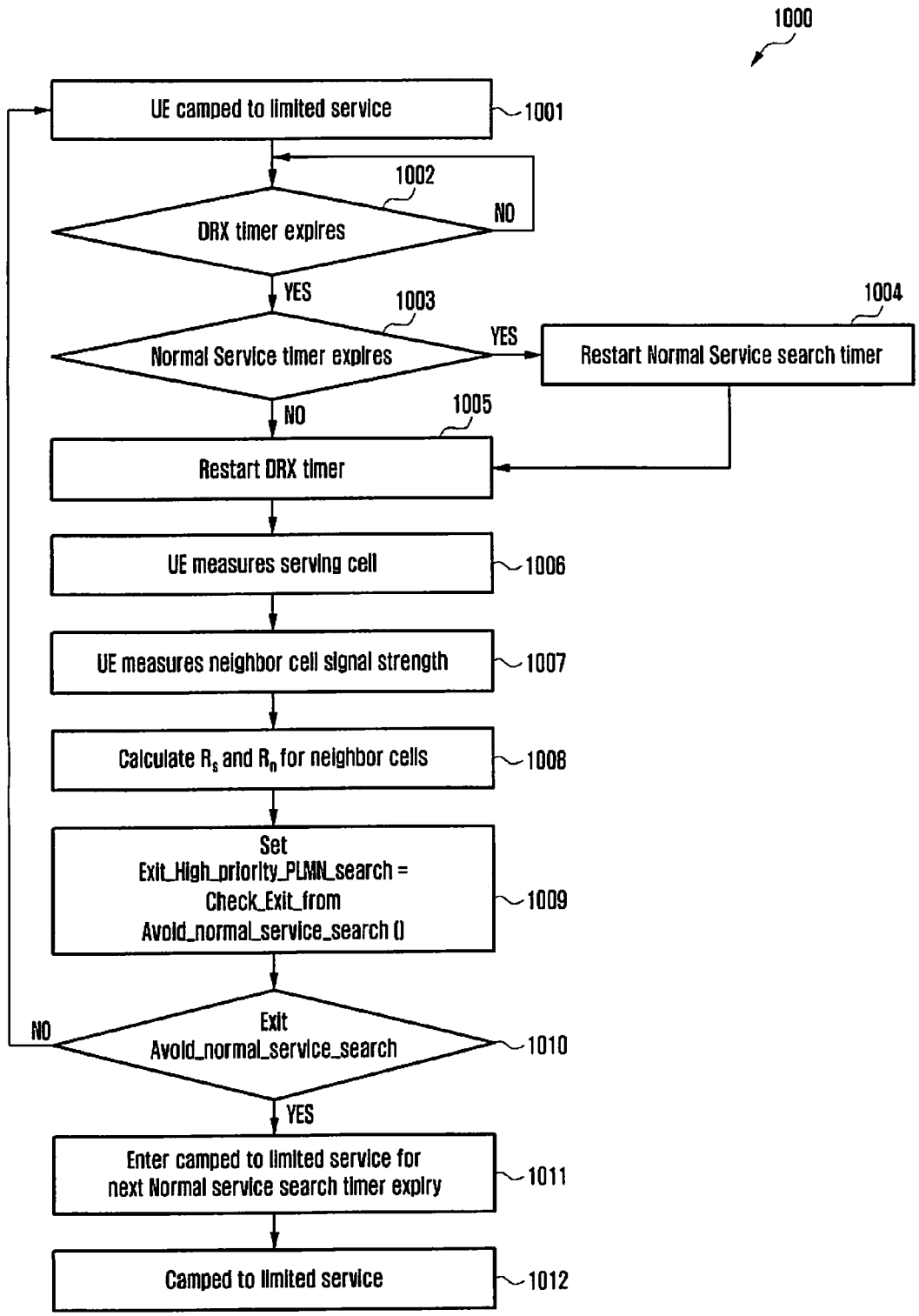
FIG. 10 is a flow chart illustrating a process for an exit_from_avoid_normal_service_search state, when a mobile station is camped to limited service, according to an embodiment of the present invention.

FIG. 10 is a flow chart illustrating a process of a exit_from_avoid_normal_service_search state, when the UE 101 is camped to limited service, according to an embodiment of the present invention. The UE 101 is camped to limited service, in step 1001. The UE 101 determines whether the DRX timer expires, in step 1002. When the DRX timer expires, the UE 101 runs the normal service search timer and determines whether the normal service search timer expires, in step 1003. Once the normal service search timer expires, the UE 101 would not perform a normal service search and can restart the Normal Service search timer, in step 1004. The UE 101 may not perform the normal service search if the network topology does not change. After, restarting the normal service timer, the DRX timer is restarted, in step 1005.

However, if the normal service search timer does not expire, the DRX timer is restarted, in step 1005. As long as the UE 101 is in an AVOID_NORMAL_SERVICE_SEARCH state, the UE 101 will not perform a high priority PLMN 103 search upon expiration of the Normal Service search timer. At every DRX timer expiry, the UE 101 measures the serving cells, in step 1006, and neighbor cells signal strength or rank, in step 1007. Further, UE 101 calculates R-criterion. The R-criterion generates rankings Rs and Rn for the serving cell and neighbor cells, respectively, in step 1008. The normal idle mode procedures in VPLMN are continued.

In every DRX cycle, when the UE 101 is camped to limited service, the UE 101 requests a Check_Exit_from_AVOID_NORMAL_SERVICE_SEARCH ( ) function to check certain necessary conditions to be met to continue in this state. The UE 101 can analyze change in network topology by analyzing change in rank, a large difference in a short term and long term average, or motion as detected by the accelerometer. Once the Check_Exit_from_AVOID_NORMAL_SERVICE_SEARCH ( ) function is executed, the function generates an output value, which can be passed back to the UE 101. The UE 101 assigns the output value of the function to Exit_from_AVOID_NORMAL_SERVICE_SEARCH, in step 1009. The necessary conditions of Exit_AVOID_NORMAL_SERVICE_SEARCH are analyzed, in step 1010. If the output value of the function is true, and UE 101 detects that the necessary conditions are not met while using the function Check_Exit_from_AVOID_NORMAL_SERVICE_SEARCH( ), the UE 101 can exit the AVOID_NORMAL_SERVICE_SEARCH state, and moves to limited service for a next normal service search timer expiry, in step 1011, and limited service can be activated, in step 1012. The exit conditions can include usage of neighbor cell Rank information, a double moving average and an accelerometer sensor, which provides an estimate of changing network topology from the perspective of the UE 101. However, if the output value of the function is false, the UE 101 returns to its limited service mode, at step 1001. The various steps in method 1000 can be performed in the order presented, in a different order or simultaneously. Further, in some embodiments of the present invention, some steps listed in FIG. 10 can be omitted.

The AVOID_NORMAL_SERVICE_SEARCH function utilizes the same conditions as those described above, such as, for example, checking whether ranks are the same for few DRX cycle, a difference between a long term and short term average is within limit, and an accelerometer sensor in the UE 101 shows low movement.

Figure 11:
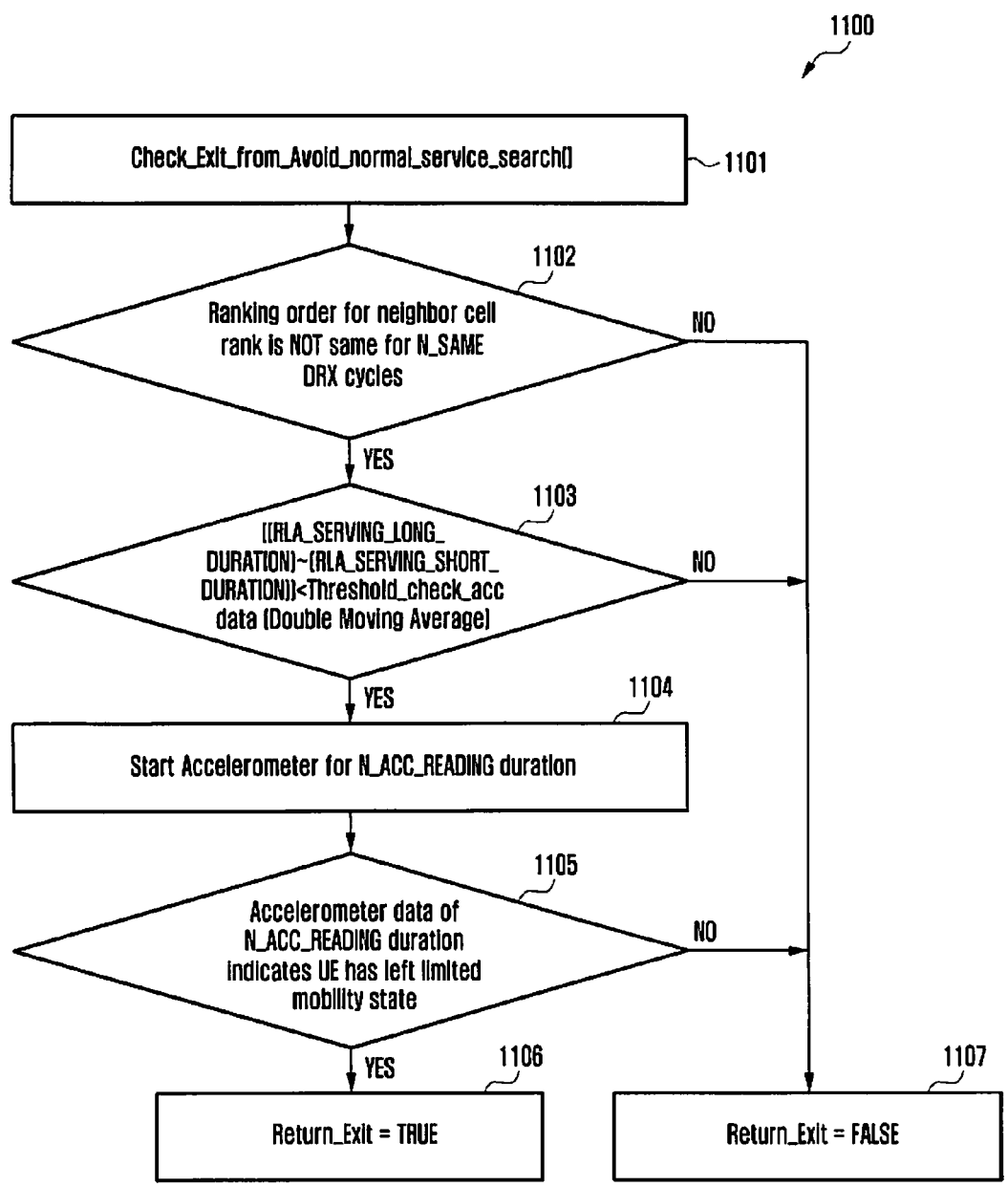
FIG. 11 is a flow chart illustrating a process for a check_exit_AVOID_NORMAL_SERVICE_SEARCH function, according to an embodiment of the present invention.

FIG. 11 is a flow chart illustrating a process of a check_exit_AVOID_NORMAL_SERVICE_SEARCH function, according to an embodiment of the present invention. The Check_Exit_from_AVOID_NORMAL_SERVICE_SEARCH ( ) function is requested and initialized, in step 1101. The function performs determines whether the ranking order for neighbor cell ranks is same for N_SAME DRX cycles, in step 1102. If the ranking order for neighbor cell ranks is not same for N_SAME DRX cycles, the function returns FALSE as the output value, in step 1107. However, if the ranking order for neighbor cell ranks is same for N_SAME DRX cycles, the function determines whether the difference between the long term and short term average is within a limit, in step 1103, i.e., ((RLA_SERVING_LONG_DURATION)−(RLA_SERVING_SHORT_DURATION))<Threshold_check_acc_data (Double Moving Average). If the difference between the long term and short term average is not within the limit, the function returns FALSE as the output value, in step 1107. However, if the difference between the long term and short term average is within the limit, the accelerometer for N_ACC_READING duration is started, in step 1104. The function determines whether the accelerometer data of N_ACC_READING duration indicates the UE 101 has left a limited mobility state. If the accelerometer data of N_ACC_READING duration does not indicate that the UE 101 has left limited mobility state, the function returns FALSE as the output value, in step 1107. However, if the accelerometer data of N_ACC_READING duration indicates that the UE 101 has left limited mobility state, the function returns TRUE as the output value, in step 1106. The various steps in method 1100 can be performed in the order presented, in a different order, or simultaneously. Further, in some embodiments of the present invention, some steps listed in FIG. 11 can be omitted.

Embodiments of the present invention, disclosed herein, may be performed by a standalone integrated circuit or an integrated circuit present within the device as described herein, where the integrated circuit is an electronic circuit manufactured by the patterned diffusion of trace elements into the surface of a thin substrate of semiconductor material. The integrated circuit further comprises of at least one processor and one memory element. The integrated circuit may be embodied as a digital integrated circuit, an analog integrated circuit or a combination of analog and digital integrated circuits, and may be made available in a suitable packaging means.

Embodiments of the present invention, disclosed herein, can be implemented through at least one software program running on at least one hardware device, and performing network management functions to control the network elements. The network elements shown in FIGS. 1 and 2 include blocks, which can be at least one of a hardware device, or a combination of a hardware device and a software module.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for selecting a serving cell in a communication network for reducing power consumption in a User equipment (UE), the method comprising the steps of:
    measuring signal strengths of a serving cell and neighboring cells;
    obtaining cell rank information for the UE based on the measured signal strengths;
    applying a double moving average principle to the cell rank information of the UE, the double moving average principle being based on a long average corresponding to when the UE is in a limited mobility state and a short average corresponding to when the UE is in a high mobility state;
    and
    optimizing Radio Frequency (RF) scans based on the cell rank information.

2. The method as in claim 1, wherein obtaining cell rank information comprises applying cell individual offsets and hysteresis to the measured signal strengths.

3. The method as in claim 1, further comprising extracting data from accelerometer sensors in the UE.

4. The method as in claim 1, wherein the RF scans are for a high priority Public Land Mobile Network (PLMN) search.

5. The method as in claim 1, wherein the RF scans are for a limited service scan.

6. The method as in claim 1, wherein the RF scans are for selecting a preferred system for searching an appropriate network.

7. The method as in claim 1, wherein optimizing the RF scans comprises stopping the RF scans if there is no change in the cell rank information.

8. The method as in claim 1, wherein the communication network comprises at least one of a second generation network, a third generation network, and a fourth generation network.

9. A User Equipment (UE) in a wireless communication network configured for reducing power consumption in the UE, wherein the UE is configured for:
    measuring signal strengths of a serving cell and neighboring cells;
    obtaining cell rank information for the UE based on the measured signal strengths;
    applying a double moving average principle to the cell rank information of the UE, the double moving average principle being based on a long average corresponding to when the UE is in a limited mobility state and a short average corresponding to when the UE is in a high mobility state;
    and
    optimizing Radio Frequency (RF) scans based on the cell rank information.

10. The UE as in claim 9, wherein the UE is configured to obtain the cell rank information by applying cell individual offsets and hysteresis to the measured signal strengths.

11. The UE as in claim 9, wherein the UE is further configured to extract a mobility state from accelerometer sensors in the UE.

12. The UE as in claim 9, wherein the RF scans are for a high priority Public Land Mobile Network (PLMN) search.

13. The UE as in claim 9, wherein the RF scans are for a limited service scan.

14. The UE as in claim 9, wherein the RF scans are for selecting a preferred system for searching an appropriate network.

15. The UE as in claim 9, wherein optimizing the RF scans comprises stopping the RF scans if there is no change in the network topology.

16. The UE as in claim 9, wherein the communication network comprises at least one of a second generation network, a third generation network, and a fourth generation network.

17. An apparatus in a wireless communication network configured for reducing power consumption in a User Equipment (UE), the apparatus comprising:
    an integrated circuit comprising at least one processor; and
    at least one memory comprising a computer program code in the integrated circuit;
    wherein the at least one memory and the computer program code are configured to, with the at least one processor, cause the apparatus to reduce power consumption by:
    measuring signal strengths of a serving cell and neighboring cells;
    obtaining cell rank information for the UE based on the measured signal strengths;
    applying a double moving average principle to the cell rank information of the UE, the double moving average principle being based on a long average corresponding to when the UE is in a limited mobility state and a short average corresponding to when the UE is in a high mobility state;
    and
    optimizing Radio Frequency (RF) scans based on the cell rank information.

18. The apparatus as in claim 17, wherein obtaining the cell rank information comprises applying cell individual offsets and hysteresis to the measured signal strengths.

19. The apparatus as in claim 17, wherein the at least one memory and the computer program code are further configured to, with the at least one processor, cause the apparatus to reduce power consumption by extracting data from accelerometer sensors in the UE.

20. The apparatus as in claim 17, wherein the RF scans are for a high priority Public Land Mobile Network (PLMN) search.

21. The apparatus as in claim 17, wherein the RF scans are for a limited service scan.

22. The apparatus as in claim 17, wherein the RF scans are for selecting a preferred system for searching an appropriate network.

23. The apparatus as in claim 17, wherein optimizing the RF scans comprises stopping the RF scans if there is no change in the network topology.

24. The apparatus as in claim 17, wherein the communication network comprises at least one of a second generation network, a third generation network, and a fourth generation network.

\* \* \* \* \*